US012609122B2

(12) United States Patent
Jung et al.

(10) Patent No.: US 12,609,122 B2
(45) Date of Patent: Apr. 21, 2026

(54) METHOD AND APPARATUS FOR LEARNING DEEPFAKE VOICE DETECTION MODEL

(71) Applicant: FOUNDATION OF SOONGSIL UNIVERSITY-INDUSTRY COOPERATION, Seoul (KR)

(72) Inventors: Sou Hwan Jung, Seoul (KR); Ki Hun Hong, Seoul (KR); Doan Thien-Phuc, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 135 days.

(21) Appl. No.: 18/748,795

(22) Filed: Jun. 20, 2024

(65) Prior Publication Data

US 2025/0299679 A1      Sep. 25, 2025

(30) Foreign Application Priority Data

Mar. 25, 2024    (KR) ........................ 10-2024-0040395

(51) Int. Cl.
G10L 13/02        (2013.01)
G10L 17/04        (2013.01)
(52) U.S. Cl.
CPC .............. G10L 17/04 (2013.01); G10L 13/02 (2013.01)
(58) Field of Classification Search
CPC .................................. G10L 13/02; G10L 17/04
See application file for complete search history.

(56) References Cited

PUBLICATIONS

Wijethunga, et al. "Deepfake Audio Detection: A Deep Learning Based Solution for Group Conversations," ICAC 2020. (Year: 2020).*
Hwang, et al. "Mel-spectrogram augmentation for sequence to sequence voice conversion," arXiv Jun. 15, 2020. (Year: 2020).*
Xu, et al. "Supervised Contrastive Learning for Generalizable and Explainable DeepFakes Detection," WACV, 2022. (Year: 2022).*
Wijethunga, et al. "Deepfake Audio Detection: A Deep Learning Based Solution for Group Conversations," ICAC 2020. (see attached reference in the previous Office action). (Year: 2020).*
Hwang, et al. "Mel-spectrogram augmentation for sequence to sequence voice conversion," arXiv Jun. 15, 2020. (see attached reference in the previous Office action). (Year: 2020).*
Xu, et al. "Supervised Contrastive Learning for Generalizable and Explainable DeepFakes Detection," WACV, 2022. (see attached reference in the previous Office action). (Year: 2022).*

* cited by examiner

*Primary Examiner* — Feng-Tzer Tzeng
(74) *Attorney, Agent, or Firm* — Stein IP, LLC

(57)        ABSTRACT
A method for learning a deepfake voice detection model and an apparatus therefor are disclosed. The method for learning a deepfake voice detection model comprises (a) resynthesizing a real voice sample using a plurality of different vocoders to generate a fake sample; (b) configuring a plurality of mini-batches using the real voice sample and the fake sample; and (c) obtaining a vocoder signature by performing supervised contrastive learning on a fake voice detection model using the plurality of mini-batches.

13 Claims, 4 Drawing Sheets

FIG. 1

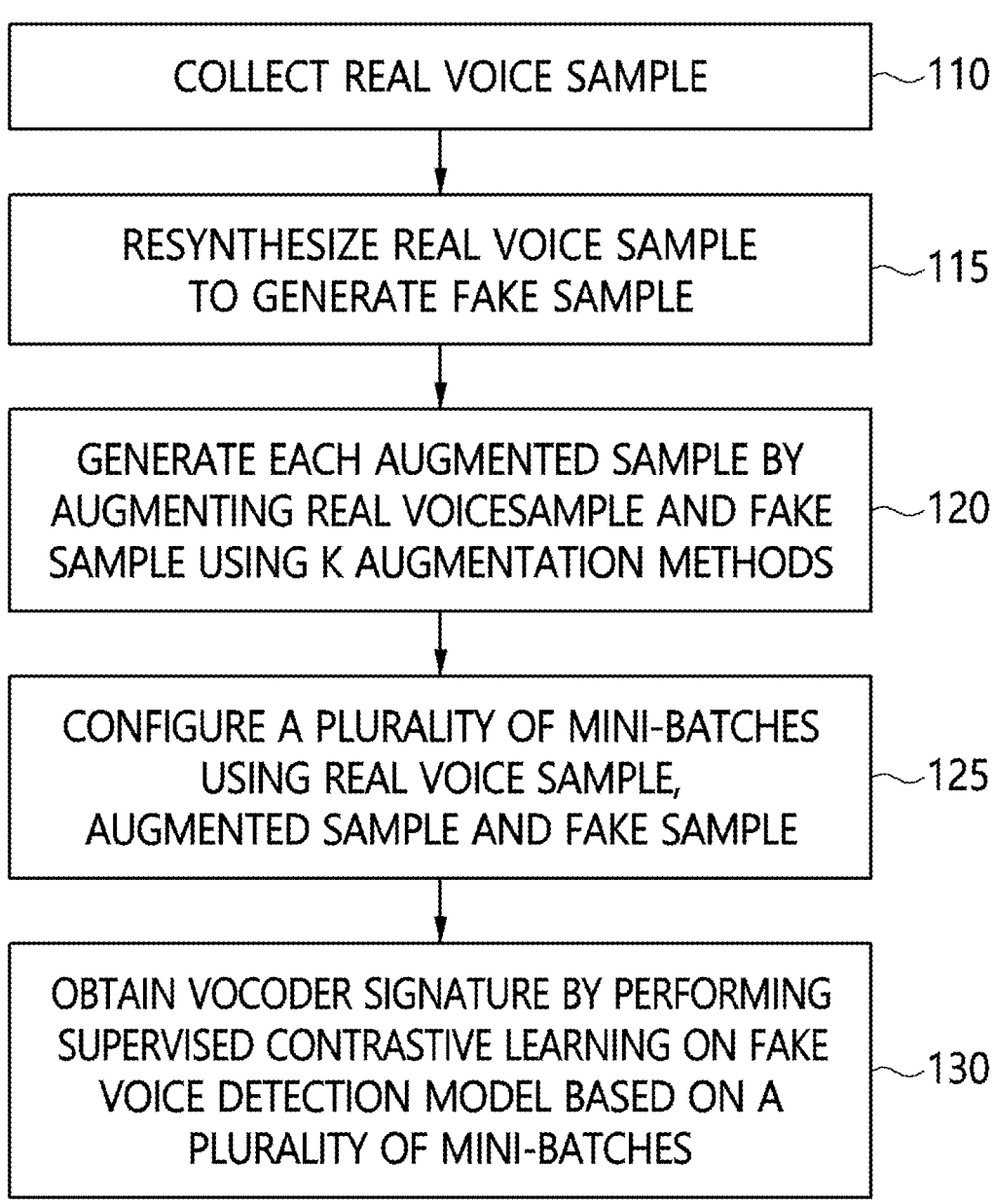

COLLECT REAL VOICE SAMPLE ~110

RESYNTHESIZE REAL VOICE SAMPLE TO GENERATE FAKE SAMPLE ~115

GENERATE EACH AUGMENTED SAMPLE BY AUGMENTING REAL VOICESAMPLE AND FAKE SAMPLE USING K AUGMENTATION METHODS ~120

CONFIGURE A PLURALITY OF MINI-BATCHES USING REAL VOICE SAMPLE, AUGMENTED SAMPLE AND FAKE SAMPLE ~125

OBTAIN VOCODER SIGNATURE BY PERFORMING SUPERVISED CONTRASTIVE LEARNING ON FAKE VOICE DETECTION MODEL BASED ON A PLURALITY OF MINI-BATCHES ~130

FIG. 2

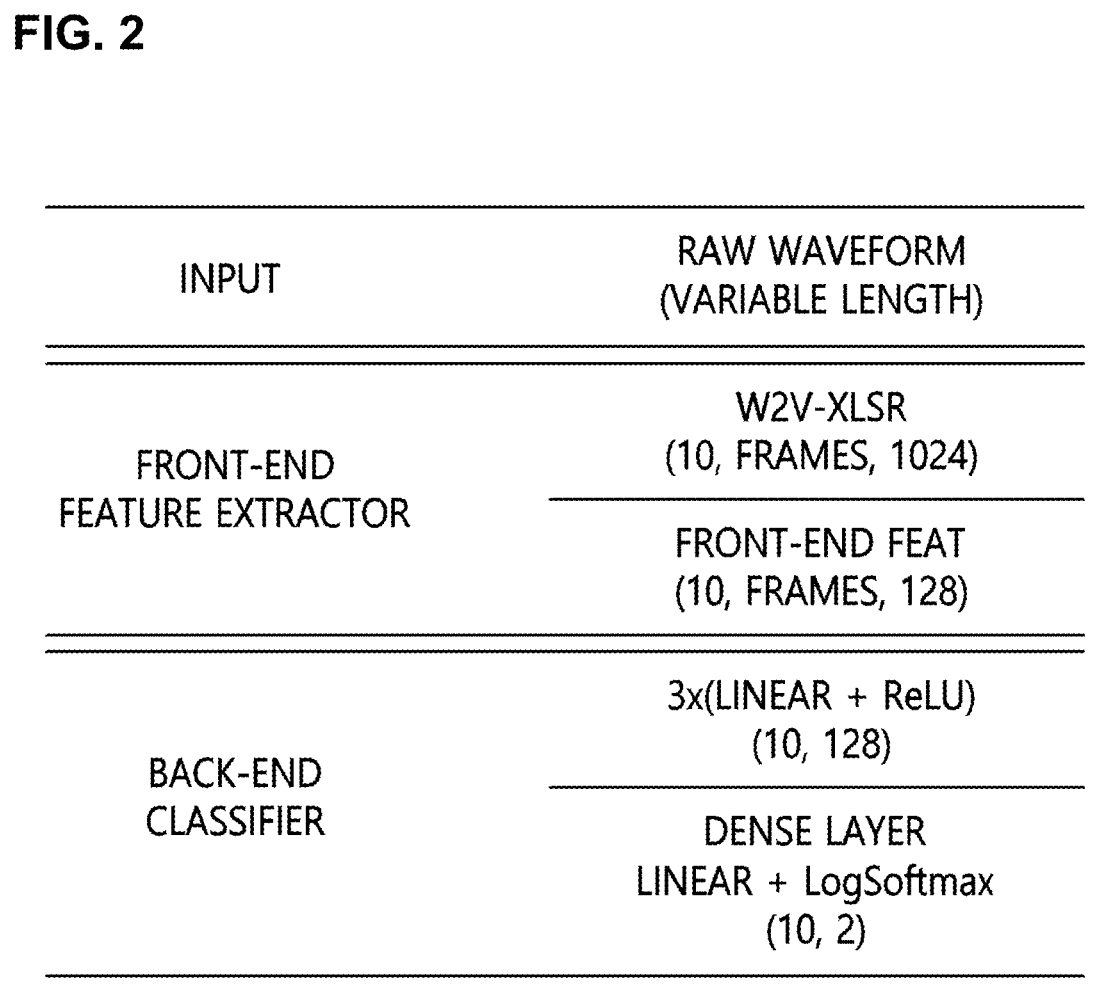

| INPUT | RAW WAVEFORM (VARIABLE LENGTH) | |
|---|---|---|
| FRONT-END FEATURE EXTRACTOR | W2V-XLSR (10, FRAMES, 1024) | |
| | FRONT-END FEAT (10, FRAMES, 128) | |
| BACK-END CLASSIFIER | 3x(LINEAR + ReLU) (10, 128) | |
| | DENSE LAYER LINEAR + LogSoftmax (10, 2) | |

FIG. 3

| | METHODS | EER |
|---|---|---|
| [23] | Wav2Vec + lightDART | 7.86 |
| [24] | Wav2Vec + FeedForward (FF) + Atn.Pool | 4.98 |
| [25] | Wav2Vec + biLSTM | 4.75 |
| [26] | Wav2Vec + ViT-based + FF | 3.18 |
| [22] | Wav2Vec + AASIST | 2.84 |
| [7] | Wav2Vec + CONFORMER | 2.58 |
| | ours SCL conf-3 (Wav2Vec + LINEAR LAYERS) | 2.17 |

METHOD AND APPARATUS FOR LEARNING DEEPFAKE VOICE DETECTION MODEL

CROSS-REFERENCE TO RELATED APPLICATIONS

This application claims the benefit of Korean Application No. 10-2024-0040395 filed on Mar. 25, 2024, in the Korean Intellectual Property Office. All disclosures of the document named above are incorporated herein by reference.

TECHNICAL FIELD

The present invention relates to a method for learning a deepfake voice detection model and an apparatus thereof.

BACKGROUND ART

Overfitting has become a significant problem in the area of voice synthesis and detection. Recently, deep learning models have many parameters and sophisticated models that are relatively prone to overfitting are being used more.

Methods for solving the overfitting problem in deep learning models use data augmentation, regularization, early stopping, model complexity reduction, and transfer learning techniques in combination.

As synthetic voice generation technology including deepfake rapidly develops, it is very difficult to distinguish between real voice and synthetic voice, and due to the nature of voice data, it is difficult to collect data from other domains.

DISCLOSURE

Technical Issues

The present invention provides a method for learning a deepfake voice detection model and an apparatus thereof.

In addition, the present invention provides a method for learning a deepfake voice detection model and an apparatus thereof that can improve the performance of deepfake voice detection by learning a vocoder signature.

In addition, the present invention provides a method for learning a deepfake voice detection model and an apparatus thereof that can improve the performance of a deepfake voice detection model by maintaining a balance between real samples and fake samples in a mini-batch and carefully selecting training samples using various augmentation methods to enhance contrastive learning.

Technical Solution

According to one aspect of the present invention, a method for learning a deepfake voice detection model is provided.

According to one embodiment of the present invention, a method for learning a deepfake voice detection model comprises (a) resynthesizing a real voice sample using a plurality of different vocoders to generate a fake sample; (b) configuring a plurality of mini-batches using the real voice sample and the fake sample; and (c) obtaining a vocoder signature by performing supervised contrastive learning on a fake voice detection model using the plurality of mini-batches.

(a) The resynthesizing the real voice sample comprises converting the real voice sample into a mel spectrogram; and resynthesizing the sample converted into the mel spectrogram into a wave form using the plurality of different vocoders to generate a fake sample.

The configuring the plurality of mini-batches comprises configuring a mini-batch for a positive class, wherein the configuring the mini-batch for the positive class comprises selecting the real voice sample as an anchor sample; selecting two real voice samples different from the anchor sample as a positive sample; selecting an augmented sample that augments the anchor sample; and selecting a plurality of fake samples generated corresponding to the anchor sample as a negative sample.

Each mini-batch comprises one anchor sample, two positive samples, one augmented sample, and four negative samples generated through four different vocoders.

The configuring the plurality of mini-batches comprises configuring a mini-batch for a negative class, wherein the configuring the mini-batch for the negative class comprises selecting two fake samples as anchor samples respectively; selecting two augmented fake samples that augment the two fake samples; and selecting a fake sample different from the two selected anchor samples as a negative sample.

According to another aspect of the present invention, an apparatus for learning a deepfake voice detection model is provided.

According to another embodiment of the present invention, a computing apparatus comprises a memory storing at least one instruction; and a processor executing the instruction stored in the memory, wherein each instruction executed by the processor performs steps comprises (a) resynthesizing a real voice sample using a plurality of different vocoders to generate a fake sample; (b) configuring a plurality of mini-batches using the real voice sample and the fake sample; and (c) obtaining a vocoder signature by performing supervised contrastive learning on a fake voice detection model using the plurality of mini-batches.

Advantageous Effects

By providing a method and an apparatus for learning a deepfake voice detection model according to one embodiment of the present invention, it is possible to improve the performance of deepfake voice detection by learning a vocoder signature.

In addition, the present invention can improve the performance of a deepfake voice detection model by maintaining balance between real samples and fake samples in a mini-batch and carefully selecting training samples using various augmentation methods to strengthen contrastive learning.

DESCRIPTION OF DRAWINGS

These and/or other aspects will become apparent and more readily appreciated from the following description of the embodiments, taken in conjunction with the accompanying drawings in which:

FIG. 1 is a flowchart showing a learning method of a deepfake voice detection model according to one embodiment of the present invention;

FIG. 2 is a diagram showing the structure of a fake voice detection model according to one embodiment of the present invention;

FIG. 3 is a diagram showing the results of comparing performance according to a conventional method and an embodiment of the present invention.

DETAILED DESCRIPTION OF EMBODIMENTS

Figure 4:
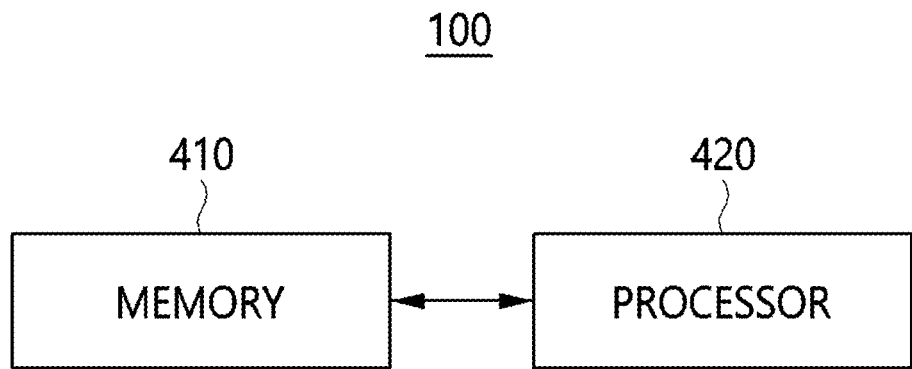
FIG. 4 is a block diagram schematically showing the internal configuration of a computing apparatus according to one embodiment of the present invention.

The singular expressions used in this specification include plural expressions unless the context clearly indicates otherwise. In this specification, terms such as "consist of" or "include" should not be construed as necessarily including all of the various components or various steps described in the specification, and should be construed as including some of the components or some of the steps may not be included, or may further include additional components or steps. In addition, terms such as " . . . unit", "module" described in the specification mean a unit that processes at least one function or operation, which may be implemented as hardware or software, or implemented as a combination of hardware and software.

Hereinafter, embodiments of the present invention will be described in detail with reference to the attached drawings.

FIG. 1 is a flowchart showing a learning method of a deepfake voice detection model according to an embodiment of the present invention, and FIG. 2 is a diagram showing the structure of a fake voice detection model according to an embodiment of the present invention.

In step 110, the computing apparatus 100 collects a real voice sample.

In step 115, the computing apparatus 100 resynthesizes the real voice sample to generate a fake sample.

This will be described in more detail.

The computing apparatus 100 may convert the real voice sample into a frequency domain by performing a short-time Fourier transform (STFT), and may convert the frequency band in the converted frequency domain into a mel scale. Then, the computing apparatus 100 may generate a spectrogram based on the frequency band converted into the mel scale. Through this series of processes, the computing apparatus 100 may convert the real voice sample into a mel spectrogram.

The computing apparatus 100 may apply the sample converted into the mel spectrogram to a neural network vocoder to generate a raw audio waveform. Here, the raw audio waveform generated by the neural network vocoder is referred to as a fake sample or a negative sample.

That is, the computing apparatus 100 may generate a negative sample by resynthesizing the sample converted into the mel spectrogram through a neural network vocoder model to generate a raw audio waveform.

The computing apparatus 100 may generate S different fake samples by applying S different neural network vocoder models to each real voice sample.

In step 120, the computing apparatus 100 generates each augmented sample by augmenting the real voice sample and the fake sample using K augmentation methods.

Therefore, the augmented sample may be an augmented sample for the real sample and an augmented sample for the fake sample. For the convenience of understanding and explanation, the augmented sample for the fake sample will be referred to as a fake augmented sample.

In step 125, the computing apparatus 100 configures a plurality of mini-batches using real voice samples, augmented samples, and fake samples, respectively.

This will be described in more detail.

For the convenience of understanding and explanation, it is assumed that there are N real voice samples (real samples), K augmented algorithms, and S different neural network vocoder models. In this case, the computing apparatus 100 can configure N mini-batches.

To configure each mini-batch, the computing apparatus 100 selects real voice samples ($x_i$, $i \in I=\{1, 2, \ldots, N\}$) as anchor samples. The computing apparatus 100 selects one augmented sample corresponding to the anchor sample. In addition, the computing apparatus 100 selects two real voice samples ($x_m$, $m \in I$ and $m \neq i$) different form the anchor sample as positive samples. In addition, the computing apparatus 100 selects a plurality of fake samples generated corresponding to the anchor sample as negative samples.

For example, each mini-batch may comprise one anchor sample, two positive samples, one augmented sample, and four negative samples.

As another example, a method of configuring a mini-batch for the negative class will be described. The computing apparatus 100 may configure a mini-batch for the negative class differently from the positive class. The computing apparatus 100 may configure a mini-batch by selecting two fake samples as anchor samples, respectively, selecting two fake augmented samples corresponding to the two anchor samples, and selecting another fake sample different from the two anchor samples as a negative sample.

Data balancing is very important because balancing the learning data of each mini-batch provides the best performance and high generalization ability. The number of real and fake samples for voice different from the anchor should be small, but at least one should exist. If there are different samples for both the positive and negative classes, the performance of the fake speech detection model that learns a good vocoder feature representation is improved, so that samples with various linguistic contents can be integrated in the feature space.

In step 130, the computing apparatus 100 obtains a vocoder signature by performing supervised contrastive learning on a fake voice detection model based on a plurality of mini-batches.

The fake voice detection model may comprise a front-end feature extraction module and a back-end classification module. The front-end feature extraction module and the back-end classification module may be configured, for example, as shown in FIG. 2.

Therefore, the computing apparatus 100 may calculate the final loss by considering the supervised contrastive loss for learning the feature representation for the vocoder signature of the fake voice detection model and the cross-entropy loss for classification.

For example, the final loss function may be expressed as in Equation 1.

$$\mathcal{L} = \mathcal{L}_{SCL}(\text{feat}) + \mathcal{L}_{SCL}(\text{emb}) + \mathcal{L}_{CE} \qquad \text{[Equation 1]}$$

Here, $\mathcal{L}_{SCL}(\text{feat})$ represents the supervised contrastive learning loss derived from the front-end feature extraction module, and $\mathcal{L}_{SCL}(\text{emb})$ represents the supervised contrastive learning loss calculated from the final hidden state output of the back-end classification module. Also, $\mathcal{L}_{CE}$ represents the cross-entropy loss between the actual label and the output predicted by the model.

Here, the supervised contrastive learning loss can be calculated using Equation 2.

$$\mathcal{L}_{SCL} = \sum_{p \in p^i \cup \{x_1\}} \frac{1}{|p^i|} \sum_{p' \in p^i} \log \left( \frac{\exp\left( f\left( x_p, x_{p'} \right) \right)}{\varphi(x_p)} \right) - \qquad \text{[Equation 2]}$$

5

-continued $$\sum_{v \in V^i} \frac{1}{|V^i| - 1} \sum_{v' \in V^i + v' \neq v} \log\left(\frac{\exp\left(f\left(x_v, x_{v'}\right)\right)}{\varphi(x_v)}\right)$$

Here, $\varphi(x_a) = \sum_{k \in Vi \cup Pi} \exp(f(x_a, x_k))$, $|A|$ represents the number of elements in A, $$f(x, y) = \frac{S_c(x, y)}{\tau}$$

represents the cosine similarity of two vectors x, y at the temperature value $\tau$, p represents the number of randomly selected real samples, v represents the number of randomly selected resynthetic samples, k represents the number of randomly selected augmentation algorithms, $P^i$ represents a set of positive samples, $V^i$ represents a set of negative samples, i represents a mini-batch index, $x_i$ represents an anchor sample in mini-batch I (i∈I={1, 2, . . . , N}), $x_p$ represents a real sample, $x_v$ represents a resynthetic sample, and $x_k$, represents an augmented sample.

The computing apparatus 100 can backpropagate the final loss function value to the fake voice detection model to optimize the weights of the parameters and learn the representation feature of the vocoder signature. Through this, the fake voice detection performance of the fake voice detection model can be further improved.

FIG. 3 is a diagram illustrating the results of comparing the performance according to a conventional technique and an embodiment of the present invention. As shown in FIG. 3, it can be seen that the model of the present invention shows the best EER (Equal Error Rate).

FIG. 4 is a block diagram schematically illustrating the internal configuration of a computing apparatus according to an embodiment of the present invention.

Referring to FIG. 4, a computing apparatus 100 according to an embodiment of the present invention is configured to include a memory 410 and a processor 420.

The memory 410 stores various instructions for performing a learning method of a deepfake voice detection model according to an embodiment of the present invention.

The processor 420 may be linked to the memory 410 and control the memory 410. For example, the processor 420 may execute instructions stored in the memory 410. The instructions executed by the processor 420 may perform a series of processes comprising resynthesizing real voice samples using different vocoders to generate fake samples respectively, configuring a plurality of mini-batches using the real voice samples and fake samples, and performing supervised contrastive learning on a fake voice detection model using the plurality of mini-batches to obtain a vocoder signature. Since this is the same as described with reference to FIG. 1, a duplicate description will be omitted.

The apparatus and method according to the embodiment of the present invention may be implemented in the form of program instructions that can be executed through various computer means and recorded on a computer-readable medium. The computer-readable medium may include program instructions, data files, data structures, etc. alone or in combination. The program instructions recorded on the computer-readable medium may be those specially designed and configured for the present invention or may be known and usable to those skilled in the art of computer software. Examples of computer-readable recording media include magnetic media such as hard disks, floppy disks, and magnetic tapes, optical media such as CD-ROMs and DVDs, magneto-optical media such as floptical disks, and hardware devices specifically configured to store and execute program instructions such as ROMs, RAMs, and flash memories. Examples of program instructions include not only machine language codes such as those generated by a compiler, but also high-level language codes that can be executed by a computer using an interpreter, etc.

The hardware apparatuses described above may be configured to operate as one or more software modules to perform the operations of the present invention, and vice versa.

The present invention has been described with reference to embodiments thereof. Those skilled in the art will appreciate that the present invention may be implemented in modified forms without departing from the essential characteristics of the present invention. Therefore, the disclosed embodiments should be considered in an illustrative rather than a limiting sense. The scope of the present invention is indicated by the claims, not the foregoing description, and all differences within the scope equivalent thereto should be construed as being included in the present invention.

The invention claimed is:

1. A method for learning a deepfake voice detection model comprising:
   (a) resynthesizing a real voice sample using a plurality of different vocoders to generate a fake sample;
   (b) configuring a plurality of mini-batches using the real voice sample and the fake sample; and
   (c) obtaining a vocoder signature by performing supervised contrastive learning on a fake voice detection model using the plurality of mini-batches,
   wherein the configuring the plurality of mini-batches comprises configuring a mini-batch for a positive class,
   wherein the configuring the mini-batch for the positive class comprises,
   selecting the real voice sample as an anchor sample;
   selecting two real voice samples different from the anchor sample as a positive sample;
   selecting an augmented sample that augments the anchor sample; and
   selecting a plurality of fake samples generated corresponding to the anchor sample as a negative sample.

2. The method of claim 1, wherein (a) the resynthesizing the real voice sample comprises:
   converting the real voice sample into a mel spectrogram; and
   resynthesizing the sample converted into the mel spectrogram into a wave form using the plurality of different vocoders to generate a fake sample.

3. The method of claim 1, wherein each mini-batch comprises one anchor sample, two positive samples, one augmented sample, and four negative samples generated through four different vocoders.

4. The method of claim 1, wherein the configuring the plurality of mini-batches comprises configuring a mini-batch for a negative class,
   wherein the configuring the mini-batch for the negative class comprises,
   selecting two fake samples as anchor samples respectively;
   selecting two augmented fake samples that augment the two fake samples; and
   selecting a fake sample different from the two selected anchor samples as a negative sample.

5. A non-transitory computer-readable recording medium having recorded thereon a program code for performing the method according to claim 1.

6. A computing apparatus comprising:

a memory storing at least one instruction; and a processor executing the instruction stored in the memory, wherein each instruction executed by the processor performs steps comprising, (a) resynthesizing a real voice sample using a plurality of different vocoders to generate a fake sample;

(b) configuring a plurality of mini-batches using the real voice sample and the fake sample; and (c) obtaining a vocoder signature by performing supervised contrastive learning on a fake voice detection model using the plurality of mini-batches, wherein the configuring the plurality of mini-batches comprises configuring a mini-batch for a positive class, wherein the configuring the mini-batch for the positive class comprises, selecting the real voice sample as an anchor sample;

selecting two real voice samples different from the anchor sample as a positive sample;

selecting an augmented sample that augments the anchor sample; and selecting a plurality of fake samples generated corresponding to the anchor sample as a negative sample.

7. The computing apparatus of claim 6, wherein (a) the resynthesizing the real voice sample comprises, converting the real voice sample into a mel spectrogram; and resynthesizing the sample converted into the mel spectrogram through the plurality of different vocoders in a wave form to generate a fake sample.

8. The computing apparatus of claim 6, wherein each mini-batch comprises one anchor sample, two positive samples, one augmented sample, and four negative samples generated through four different vocoders.

9. The computing apparatus of claim 6, wherein the configuring the plurality of mini-batches comprises configuring a mini-batch for a negative class, wherein the configuring the mini-batch for the negative class comprises, selecting two fake samples as anchor samples respectively;

selecting two augmented fake samples that augment the two fake samples; and selecting a fake sample different from the two selected anchor samples as a negative sample.

10. A non-transitory computer-readable recording medium having recorded thereon a program code for performing the method according to claim 2.

11. A non-transitory computer-readable recording medium having recorded thereon a program code for performing the method according to claim 1.

12. A non-transitory computer-readable recording medium having recorded thereon a program code for performing the method according to claim 3.

13. A non-transitory computer-readable recording medium having recorded thereon a program code for performing the method according to claim 4.

* * * * *